Figure 1:
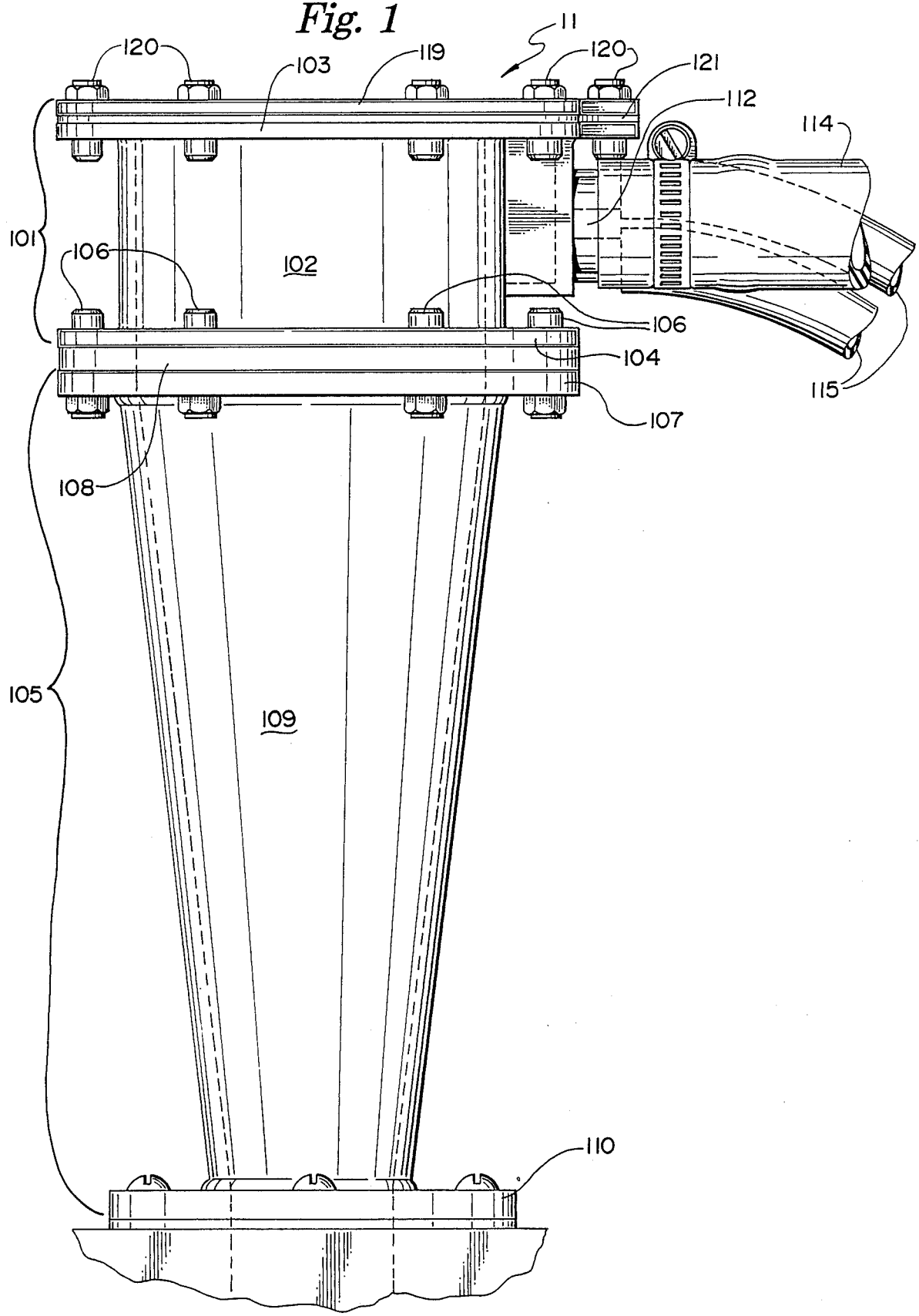

United States Patent [19]

Barnes et al.

[11] Patent Number: 4,948,396
[45] Date of Patent: Aug. 14, 1990

[54] COMPOUND VORTEX FILTERING APPARATUS

[75] Inventors: Walter K. Barnes, Embleton; John M. Separovich, Kardinya, both of Australia

[73] Assignee: Cleanair Engineering Pty. Ltd., Australia

[21] Appl. No.: 400,700

[22] Filed: Aug. 30, 1989

Related U.S. Application Data

[63] Continuation-in-part of Ser. No. 299,801, Dec. 1, 1988, abandoned.

[51] Int. Cl.$^5$ ............................................. B01D 45/12
[52] U.S. Cl. ......................................... 55/92; 55/235; 55/257.1; 55/260; 55/315
[58] Field of Search ................... 55/89, 92, 235–237, 55/257.1, 257.4, 259, 315, 317

[56] References Cited

U.S. PATENT DOCUMENTS

| | | | |
|---|---|---|---|
| 2,315,226 | 3/1943 | Rohlin | 55/235 |
| 4,286,973 | 9/1981 | Harrlin et al. | 55/92 |

FOREIGN PATENT DOCUMENTS

| | | |
|---|---|---|
| 140599 | 12/1947 | Australia . |
| 257165 | 4/1963 | Australia . |
| 271342 | 5/1965 | Australia . |
| 284316 | 10/1965 | Australia . |
| 289057 | 4/1966 | Australia . |
| 505239 | 12/1977 | Australia . |
| 493927 | 6/1978 | Australia . |
| 547909 | 12/1982 | Australia . |
| 851555 | 10/1960 | United Kingdom . |
| 1558008 | 12/1979 | United Kingdom . |

Primary Examiner—Charles Hart
Attorney, Agent, or Firm—Dorsey & Whitney

[57] ABSTRACT

An apparatus and method for separating contaminants from gaseous flow characterized by the formation of a compound vortex with an outer liquid filter medium strata and an inner contaminated gaseous strata. Contaminants are transferred from the gaseous strata to the liquid filter medium strata thereby filtering the gaseous flow. The compound vortex is formed by simultaneously feeding the contaminated gas and a liquid filter medium, most typically water, in distinct parallel streams into a primary cyclone vessel having an elongated cavity with a substantially circular cross section. A secondary cyclone separate is also disclosed for separating the filtered gas from the liquid filter medium/contaminants mixture and for separating the contaminants from the liquid filter medium.

13 Claims, 4 Drawing Sheets

COMPOUND VORTEX FILTERING APPARATUS

This is a continuation in part of application Ser. No. 299,801, filed Dec. 1, 1988, now abandoned.

This invention relates to an apparatus for, and a method of, separating contaminants from a gaseous flow such as an airstream, which contaminants are entrained in the gaseous flow and may comprise solids, liquids, vapours or other gases including fumes, or any combination thereof. Examples of solids separable from suspension in air by the present invention include asbestos dust, hydrocarbons such as those suspended in internal combustion engine exhaust, carbon dioxide, carbon monoxide, free carbon, sodium chloride, silica dust, sulphur dioxide, nitrides, household dust, agricultural dust, pollen spores, fungus cell threads, housemites, oil smoke, coal dust fly ash and bacteria.

Known filtering systems for separating contaminants from an air or other gas stream rely on impingement of the contaminants on an arresting surface, which may be in the form of a screen or a bag filter, or on collision with liquid droplets, such as water spray. These filtering systems have several deficiencies, one of which is that the arrestance efficiency is poor for minute particulates. In the case of particles below five microns, collision does not occur with liquid filter medium droplets, such as a water spray, because the contaminent particles flow around the liquid droplet. This phenomenon makes the arrestance efficiency of prior art filtering devices very low for particles below five microns. A further deficiency is that the impingement surface of static screens and bags requires frequent cleaning to remove accumulated contaminants thereon. The need to remove the contaminants from the impingement surface is time consuming and introduces the possibility that a portion of the accumulated contaminants may escape to atmosphere. A further deficiency is that the arresting surface is vulnerable to deterioration in circumstances where the contaminants in the gas stream are abrasive. A still further deficiency of such known filtering systems is that the impingement surface is not entirely effective in removing liquid contaminants, fumes, mists or gases.

It is an object of this invention to provide an apparatus for, and a method of, separating contaminants both gaseous and aerosols from a carrier gas stream without relying upon impingement of the contaminants on a static arresting surface to effect such separation and without relying on collision of contaminant particles with liquid medium droplets.

In one form the invention resides in an apparatus for filtering a gas stream to remove contaminant gaseous, liquid or solid aerosol particulates entrained therein. The apparatus comprises a primary cyclone vessel into which is independently fed the gas stream and a liquid filter medium. This primary cyclone vessel is provided with means for imparting to the gas stream and the liquid filter medium a cyclonic/rotary motion, which by their individual fluid pressure energies, form a compound vortex having an outer liquid strata and an inner gaseous strata establishing an interface boundary therebetween. The interactive force dynamics established within such a compound vortex flow regime, directly force all contaminants above five microns to be transferred from the carrier gas flow and into the liquid phase into absorption across the interface boundary. Simultaneously, at least a substantial portion of the contaminants below five microns, including contaminant gas molecules and submicron aerosols, are converted from gaseous phase to liquid phase by a process of mass transfer, and also cross this interface boundary, into absorption in the liquid filter medium vortex. The gas and the liquid filter medium with contaminants absorbed therein are discharged from the primary cyclone vessel as a single entity. A secondary cyclone vessel in which the discharge from the primary cyclone vessel is tangentially injected as a combined mass, to impart a cyclonic motion thereto; thereupon separates the gas into the upper part of the vessel substantially free of contaminants, with the liquid filter medium and the contaminants entrained therein in the lower part of the vessel, and means to discharge the gas from the upper part of the vessel, and means through which the liquid filter medium contaminants sludge is withdrawn from a lower part of the vessel.

In the secondary cyclone chamber, the liquid filter medium carrying the contaminants separates from the gas stream under cyclonic action, owing to the difference in the specific gravities of the gaseous fluid and the liquid filter medium respectively. The centrifugal forces on the liquid filter medium also lead to vertical stratification of solid contaminants held in the liquid according to the various specific gravities of the solid contaminants, thereby to effectively prevent further contact of the solid contaminants with the gas stream. As the rotating liquid mass progressively loses its inertial energy and the influence of gravity on the liquid mass progressively increases, the rotating liquid mass gradually descends, while still maintaining the vertical stratification of the contaminants therein owing to the continuing centrifugal forces.

Preferably, a liquid cyclone chamber containing a body of the liquid filtering medium is provided at the bottom of the secondary cyclone chamber, the body of liquid preferably being the liquid filtering medium being caused to rotate under the influence the cyclonic action occurring in the cyclone chamber. As the rotating liquid mass in the secondary cyclone chamber gradually descends, it enters the body of liquid in the liquid cyclone chamber. The kinetic energy of the rotating liquid mass imparts rotational force to the body of liquid to generate cyclonic action therein which produces vertical stratification of contaminants in the body of liquid.

To facilitate settling of the contaminants in the body of liquid, there may be provided means to regulate the speed of rotation of a vortex generated by the cyclonic action so as to allow the forces of gravity to exert a greater influence than the centrifugal forces of gyration. The regulating means may comprise baffles or other obstructive elements in the liquid cyclone chamber towards the bottom thereof.

For the purposes of economy, the liquid filtering medium introduced into the primary cyclone vessel with the gas stream is preferably recirculated, the liquid being withdrawn from the central region of the body of liquid at which region the liquid is least contaminated.

From time to time the body of liquid at the bottom of the cyclone chamber may be exchanged or at least the contaminants settling at the bottom of the body of liquid may be drawn off or dumped and replenishment liquid added.

In another form, the invention resides in a method of filtering a gas stream to remove liquid or solid particulate contaminants entrained therein, comprising feeding the gas stream together with a liquid filter medium into a chamber to impart to the gas and the liquid filter medium a cyclonic/rotary motion to form a compound vortex having an outer liquid strata and an inner gaseous strata with an intimate interface boundary therebetween, whereby at least a substantial proportion of the contaminants are transferred from the gas to the liquid filter medium, and discharging both the gas and liquid filter medium with contaminants as a single entity.

Figure 3:
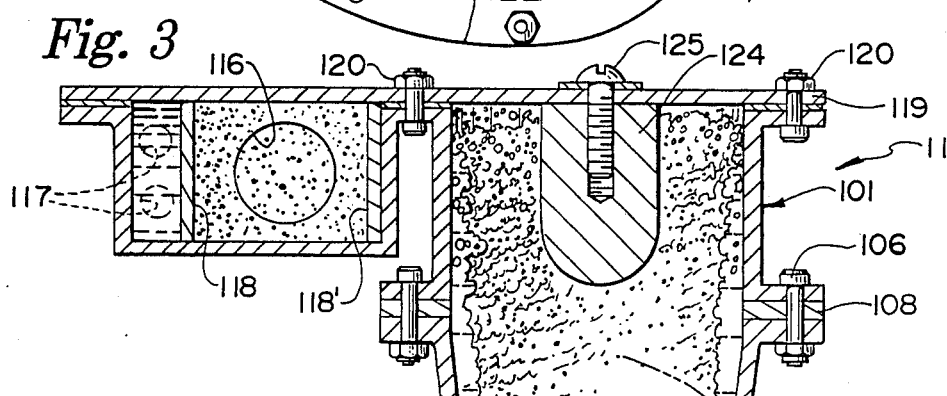
Figure 4:
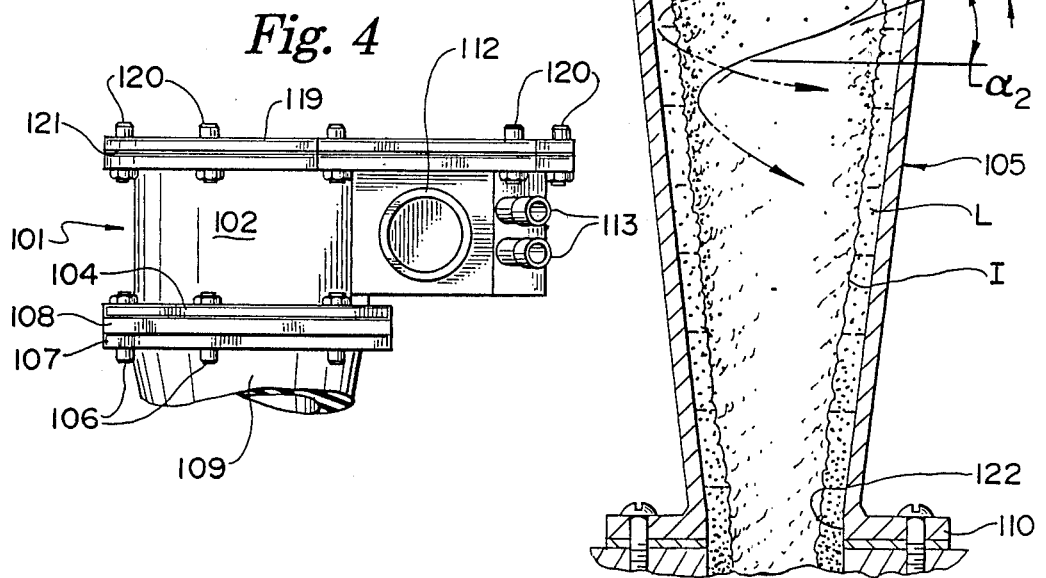

After leaving the primary cyclone vessel, the gas stream carrying the liquid with the contaminants absorbed therein is subjected to cyclonic action in a secondary cyclone chamber resulting in separation of the filtered gas from the liquid filter medium, and which includes means for extraction of the filtered gas from the secondary cyclone chamber and the collection of a body of liquid at the bottom thereof whereby the body of liquid is caused to rotate owing to the cyclonic action.

Preferably, the means for extracting filtered gas from the secondary cyclone chamber includes an outlet having a moisture trap.

Preferably, the liquid filter medium introduced into the gas stream is drawn from the body of liquid at or near the central region thereof.

The invention will be better understood by reference to the following description thereof as shown in the accompanying drawings in which:

FIG. 1 is a side view of the primary cyclone vessel.

FIG. 2 is a top view of the primary cyclone vessel of FIG. 1 with the cover plate shown partially removed to show the tangential inlet for the liquid filter medium and the contaminated gas.

FIG. 3 is a verticle sectional view of the primary cyclone vessel taken on the line 3—3 of FIG. 2 and shows the compound vortex consisting of an outer liquid filter medium strata in contact with the wall of the primary cyclone vessel and the inner contaminated gaseous strata, and the interface between them.

FIG. 4 is a partial side view of the primary cyclone vessel showing the contaminated gas inlet sleeve and the liquid filter medium inlet sleeves.

FIG. 5 is a schematic side view of the primary cyclone vessel of FIG. 1 disposed vertically in combination with a secondary cyclone vessel for separating the filtered gas from the liquid filter medium, separating the contaminants from the liquid filter medium, extracting the filtered gas from the secondary cyclone vessel, extracting moisture from the filtered gas and recirculating clean liquid filter medium back to the primary cyclone vessel.

FIG. 6 is a schematic top view showing the primary cyclone vessel disposed horizontally in combination with a secondary cyclone vessel.

FIG. 7 is a schematic side view of a modified primary cyclone vessel in combination with a secondary cyclone vessel.

FIG. 8 is a top view of the primary and secondary cyclone vessels of FIG. 7.

The preferred embodiment of the present invention is shown in FIGS. 1–5.

The filtering apparatus comprises a gas-liquid compound primary cyclone vessel 11, interconnected to a secondary cyclone separator 13 and an exhaustor 15. Air carrying dust and other contaminant particles is conveyed to the gas liquid compound primary cyclone vessel 11 at which a liquid filtering medium and the carrier gas are introduced, independently but simultaneously into the primary cyclone vessel 11 by means to establish a double whirling vortex, the outer liquid filter medium strata thereof having an intimate contact boundary or interface with the inner whirling air stream strata, so as to absorb the contaminants as they are forced to cross the boundary into the liquid. The contaminants are thus transferred from suspension in the gas stream to suspension in the liquid filter medium. The air stream carrying the liquid with the contaminants absorbed therein, is then introduced into the secondary cyclone separator 13 at which the liquid with the contaminants absorbed therein, is separated from the air stream. The exhaustor 15 discharges the cleaned air to atmosphere or other suitable point of disposal.

The liquid filter medium introduced into the air stream may comprise water having one or more additives including wetting agents, dispersants, emulsifying and anti-foaming agents, germicides, fungicides, insecticides and active chemical neutralising agents.

The specific design and construction of the preferred embodiment of the primary cyclone vessel 11 is shown in FIGS. 1–4. Primary cyclone vessel 11 is formed with an inlet section 101, which has a cylindrical wall 102, an upper flange 103 and a lower flange 104 and forms a cylindrical cavity. Inlet section 101 is connected to the truncated conical section 105 of primary cyclone vessel 11 by fasteners 106, which extend through lower flange 104 of inlet section 102 and through upper flange 107 of conical section 105. Gasket 108 is disposed between the flanges. Conical section 105 includes wall 109 and lower flange 110. The inlet and conical sections thus form a primary cyclone vessel with walls 102 and 109, which form an elongated cavity with a circular cross section, best seen in FIGS. 2 and 3.

With reference to FIGS. 1, 2 and 4, inlet section 101 includes means for independently feeding a contaminated gas stream and a stream of liquid filter medium tangentially into the cavity of the primary cyclone vessel, consisting of a gas inlet sleeve 112 and a pair of liquid filter medium inlet sleeves 113. Inlet hoses 114 and 115 are connected to the gas inlet sleeve 112 and liquid filter medium inlet sleeves 113, respectively. Inlet section 101 includes gas inlet aperture 116 and liquid filter medium apertures 117, which communicate with their respective inlet sleeves 112 and 113. A flow guide 118' conducts the flow from both the gas and liquid filter medium inlets tangentially into the cylindrical cavity of primary cyclone vessel 11, as best seen in FIG. 2. A similar flow guide 118' is also provided for the contaminated gas stream, G. The contaminated gas stream, G, and the liquid filter medium, L, are thus conducted independently in the same direction, tangentially into the cavity of the primary cyclone vessel, with the liquid stream or strata, L, in contact with the wall 102 and 109 of the vessel and with the gas stream or strata, G, in contact with the liquid strata, L, forming an interface at I, as shown in FIG. 3.

Cover plate 119 is connected to upper flange 103 of inlet section 101 with fasteners 120. A gasket 121 is disposed between cover plate 119 and flange 103.

Outlet 122 is provided at the end of primary cyclone vessel 11 opposite inlet section 101 for discharging the gas stream/liquid filter medium contaminants mixture from primary cyclone vessel 11.

With reference to FIG. 3, a false vortex finder 124 is mounted to cover plate 119 with fastener 125 with its axis on the longitudinal axis of primary cyclone vessel 11, to aid in promoting rotary cyclonic motion of the liquid and gas in primary cyclone vessel 11 and the formation of the compound vortex consisting of the rotating outer liquid strata, L, and the inner gaseous strata, G, shown in FIG. 3.

To complete the arrestance and disposal of the contaminants which have been caused to be transferred from gaseous phase to liquid phase by the action of the first stage of this invention, the compound gas liquid primary cyclone vessel 11, the complete filtration apparatus includes means to separate the cleaned gas from the contaminated liquid filter medium, means to keep the primary cyclone vessel 11 supplied with fresh liquid filter medium or a recirculated flow thereof below saturation level and a means for concentrating the contaminants in the liquid filter medium to a saturated pumpable sludge or slurry for safe disposal.

In one form, this may be combined (but not limited to) a secondary cyclone separator 13 as shown in FIGS. 5-8 of the drawings, consisting of cylindrical cannister type container or vessel having a body 41 fitted with a removable cover of variable shape 43 which can be locked in a sealed position and a fixed sealed bottom of variable shape 61 fitted with an opening and valve 63. This vessel is further fitted with an entry nozzle 51 in the upper third of its body 41, located approximately one eighth ($\frac{1}{8}$) of the vessel's height downward from its top, so positioned that it will receive the exit outflow mixture from the gas-liquid primary cyclone vessel 11, with which it is interconnected, and introduce such air liquid mass into the vessel tangentially onto the vessel's cylindrical rotational wall 41. An air stream outlet 57 from the vessel is provided for, located in the side wall 41 of the vessel, just below the removable cover, or alternatively, through the cover itself. Located approximately one fourth of the body's height upwards from its bottom, is positioned, as shown on the drawings, a sedimentation grid 50.

In operation, approximately the lower two thirds of the vessel is filled with a batch of liquid filter medium which, together with the sedimentation grid, divides the vessel into three separate chambers as follows:

The lower chamber 47 between the bottom 61 and the sedimentation grid 50 provides a quiescent gravity sedimentation zone 47 wherein the contaminants transferred to the liquid filter medium in the primary cyclone vessel 11 eventually accumulate until the liquid therein becomes a fully saturated slurry or sludge, which may be safely drawn off from the chamber 47, through the valve 63, as further explained hereinafter.

The intermediate chamber 48 consists of that section of the vessel between the top of the sedimentation grid and the surface of the body of liquid filter medium located approximately one third of the vessel's height downward from its top 43 and constitutes the liquid cyclone chamber 48. Rotational velocity of the liquid filter medium therein is controlled by at least one baffle 45, the purposes of which will be fully explained hereinafter.

The upper chamber 49 between the surface of the liquid filter medium and the top 43 of the vessel constitutes the gas separator cyclone chamber 49. The clean air and contaminated liquid filter medium mixture introduced therein through the entry nozzle 51 is forced to be separated by the centrifugal force dynamics generated therein. The gas is drawn off through the air outlet 57 by the exhauster 15 and returned to the atmosphere; whilst the contaminated liquid filter medium although in cyclonic rational movement also under the influence of gravity descends vertically along the rotational wall of the vessel into the liquid cyclone chamber 48. As this liquid mass enters the surface of the liquid which constitutes the bottom of the gas separator cyclone chamber 49, it imparts by virtue of its momentum a circular gyration to that body of liquid above the sedimentation grid 50 and thus activates the liquid rotational motion required in the liquid cyclone chamber 48.

The gas cyclone chamber 49 is provided with an entry nozzle 51 which receives the mixture exiting from the outlet 122 of the gas-liquid compound primary cyclone vessel 11 and introduces that mixture tangentially into the secondary cyclone vessel 13. The entry nozzle 51 has an inlet end 53 which communicates with the outlet 122 of the gas-liquid compound primary cyclone vessel 11, and an outlet end 55 from which the mixture issues substantially tangentially to the circular side wall of the chamber. The cross sectional area of the nozzle progressively decreases along the length of the nozzle from the inlet end to the outlet end. The inlet end of the nozzle is circular in section and the outlet end is in the form of an elongated opening extending vertically.

An air outlet 57 is provided in the upper region of the gas cyclone chamber 49. The air outlet is connected to the intake end of the extractor 15 and is provided with a moisture trap 59 when required.

At the bottom 61 of the chamber 47 there is an outlet provided with a valve 63 by means of which the body of water in the liquid cyclone chamber 48 may be changed from time to time.

As will be fully explained hereinafter, the body of liquid within the liquid cyclone chamber 48 is caused to rotate and undergo cyclonic action under the influence of the cyclonic action taking place within the gas cyclone chamber 49. Means in the form of baffles 45 or other obstructive elements are provided towards the lower end of the liquid cyclone chamber 48 to regulate the rotational speed of the body of liquid so as to allow settling of contaminants contained in the body of liquid.

Recirculated liquid filter medium delivered to its tangential entry supply line 115 to the gas-liquid compound primary cyclone vessel 11 is obtained from the body of liquid in the secondary cyclone separator 13. In this connection, there is a liquid supply line 65 having an inlet 67 opening into the body of liquid and an outlet communicating with the liquid filter medium inlet of primary cyclone vessel 11. A pump 69 is incorporated in the supply line for delivering the liquid to the primary cyclone vessel 11. The inlet end of the supply line is located in the upper central region of the body of liquid filter medium so as to intake liquid which has a relatively lower level of contamination, as will be explained later.

Figure 2:
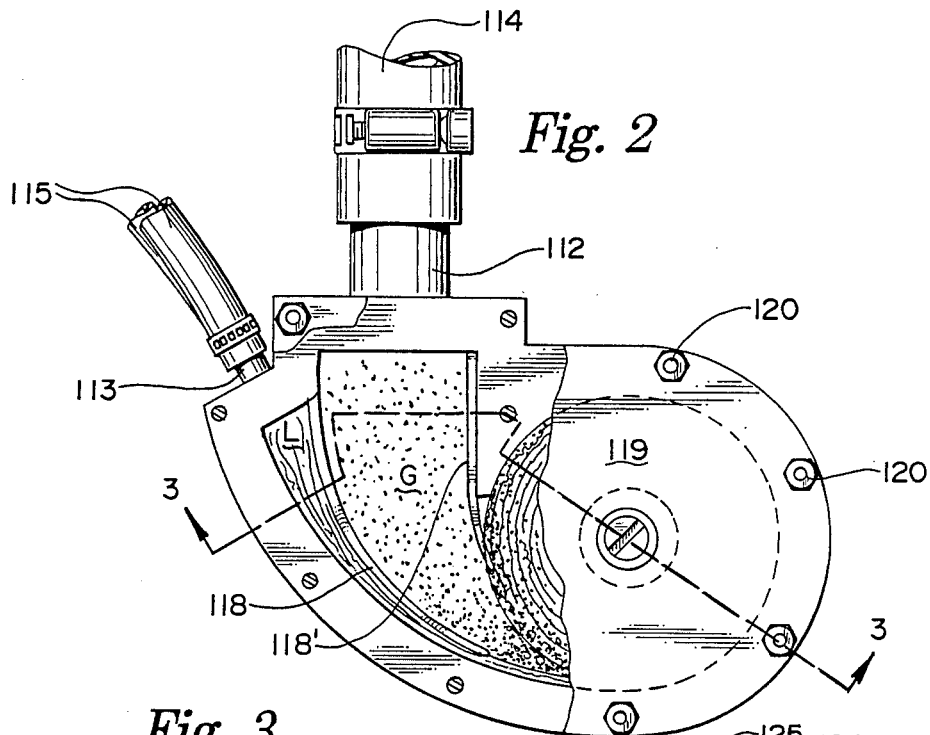

Operation of the filtering device will now be described. Contaminated gas is introduced tangentially into inlet section 101 of primary cyclone vessel 11 through hose 114, inlet sleeve 112, and inlet aperture 116. With a gas inlet aperture of 40 mm. in diameter and a primary cyclone vessel with an 80 mm. inlet diameter in the configuration shown in FIG. 1-4, a suitable input velocity for the contaminated gas consisting of diesel exhaust hydro carbons suspended in air has been found to be in the range of 7 m./sec-25 m./sec. measured at inlet aperture 116. Simultaneously but independently, a stream of liquid filter medium, most typically water, is introduced tangentially into inlet section 101 of primary cyclone vessel 11 through hoses 115, sleeves 113 and apertures 117. The liquid filter medium is introduced in a stream with a velocity sufficient to produce a outer liquid strata in primary cyclone vessel 11 with a wall thickness of about 12 mm. In a size and configuration of the primary cyclone vessel 11 shown in FIGS. 1-4, a suitable velocity and wall thickness is achieved with a liquid filter medium inlet pressure, measured at the inlet aperture 117 in the range of 2-16 psi. The separate streams then enter inlet section 101 in the same direction in parallel tangential paths flowing along flow guide 118 and enter the cavity or chamber of primary cyclone vessel 11 as shown in FIG. 2.

In general, the rotational velocity of the liquid filter medium should be about one-half of the rotational velocity of the contaminated gas in primary cyclone vessel 11.

The contaminated gas input velocity range and liquid filter medium input pressure range are exemplary only and are suitable for the size and configuration of the primary cyclone vessel 11 shown and are suitable for filtering hydro carbons from diesel exhaust with water as the liquid filter medium. With other sizes and configurations of cyclone vessels and with other contaminants, gases and liquids, suitable input and velocity ranges may vary considerably from those given.

With reference to FIG. 3, the liquid filter medium, L, and the contaminated gas, G, follow a counterclockwise, spiral path through primary cyclone vessel 11 with the filter medium liquid, L, forming an outer strata along the wall of primary cyclone vessel 11 and the contaminated gas, G, forming an inner strata. The liquid strata, L, advances through primary cyclone vessel 11 at the angle alpha sub 1 while the contaminated gas advances at the angle alpha sub 2. A compound vortex is thus formed and contaminant particles of all sizes in contaminated gas, G, are caused to pass by the mass transfer process from suspension in the gas, through the interface, I, and into the liquid filter medium, L, thus separating the particles from gaseous suspension and filtering the gas. This operation of the invention, as understood, is most significant in transferring aerosol particles below five microns and contaminant gases from carrier gas entrainment into absorption and liquid entrainment.

The mixture of filtered air and liquid with contaminants absorbed therein, is then conveyed to the secondary cyclone separator 13 and is introduced tangentially into the gas cyclone chamber 49 by the entry nozzle 51. The mixture entering the gas cyclone section is subjected to cyclonic action which causes separation of the air from the liquid carrying the contaminants, owing to the difference in the respective specific gravity of the air and the liquid. The liquid clings to the peripheral wall of the gas cyclone chamber developing into a liquid mass on the wall and the centrifugal forces on the liquid mass leads to vertical stratification of the solid particles held within the liquid mass, according to their various specific gravities thereby to effectively prevent further contact between the contaminants and the air stream. As the rotating contaminated liquid mass loses its inertial energy and under the influence of gravity, the rotating liquid mass gradually descends, while still maintaining the vertical stratification owing to the continuing centrifugal forces. When the rotating liquid mass enters the body of liquid in the liquid cyclone chamber 48, the kinetic energy of the rotating liquid mass imparts a rotational force to the body of liquid, which in turn generates cyclonic action therein. This cyclonic action maintains the vertical stratification of contaminants, initially achieved within the liquid mass. The rotational speed of the body of liquid is reduced by the baffles 45 or other obstruction elements so as to allow the forces of gravity to exert a greater influence than the centrifugal forces of gyration on the contaminants so as to facilitate settling thereof through the grid 50 into the sedimentation zone. Because of the vertical stratification in the rotating body of liquid and centripetal forces inherent in cyclonic action, the upper central region of the body develops a zone of relatively uncontaminated liquid and provides a suitable joint from which the liquid filter medium may be drawn for recirculation to the liquid entry of the gas-liquid primary cyclone vessel 11. It will be recognized by those familiar with the state of the art that the results obtained by this intermediate liquid cyclone chamber are the same as that of an industrial coaqulation and/or particle concentrator tank, which provides the rotational movement to the contaminated liquid therein by mechanically rotating paddles or baffles; whereas the liquid in this described intermediate chamber of the apparatus subject of this invention is rotating in circular motion past the stationery baffles or other obstructions.

Air which has separated from the liquid and contaminants in the gas cyclone chamber 49 is now clean and leaves the gas cyclone chamber 49, through the moisture trap/mist eliminator 59 and/or the outlet 57 and is conveyed through the exhaustor 15 to atmosphere or other suitable point of disposal.

The body of liquid contained within the liquid cyclone chamber can be exchanged from time to time so that it does not become ineffective owing to a saturation with contaminants. As an alternative to exchanging the entire body of liquid, the contaminated liquid sludge at the bottom may be drawn-off, either continuously or periodically, and replenishment liquid supplied. This facilitates safe disposal of the contaminants as they are contained within liquid sludge discarded to waste.

Figure 6:
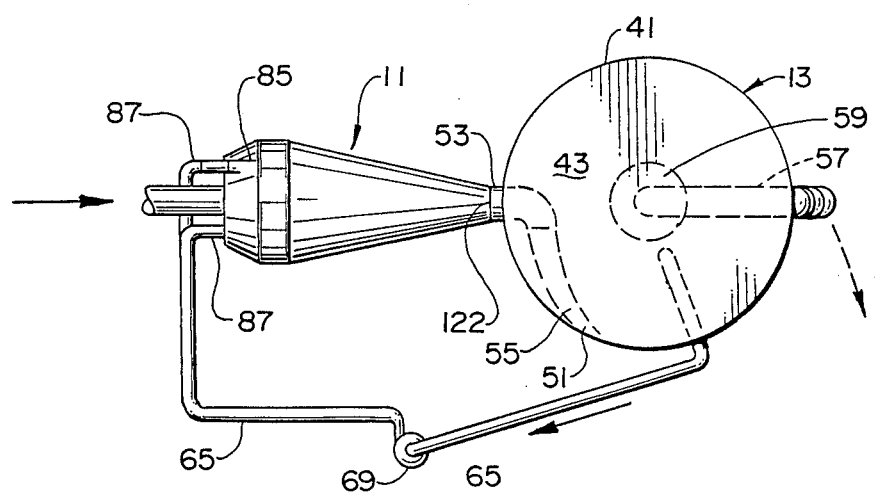
Figure 5:
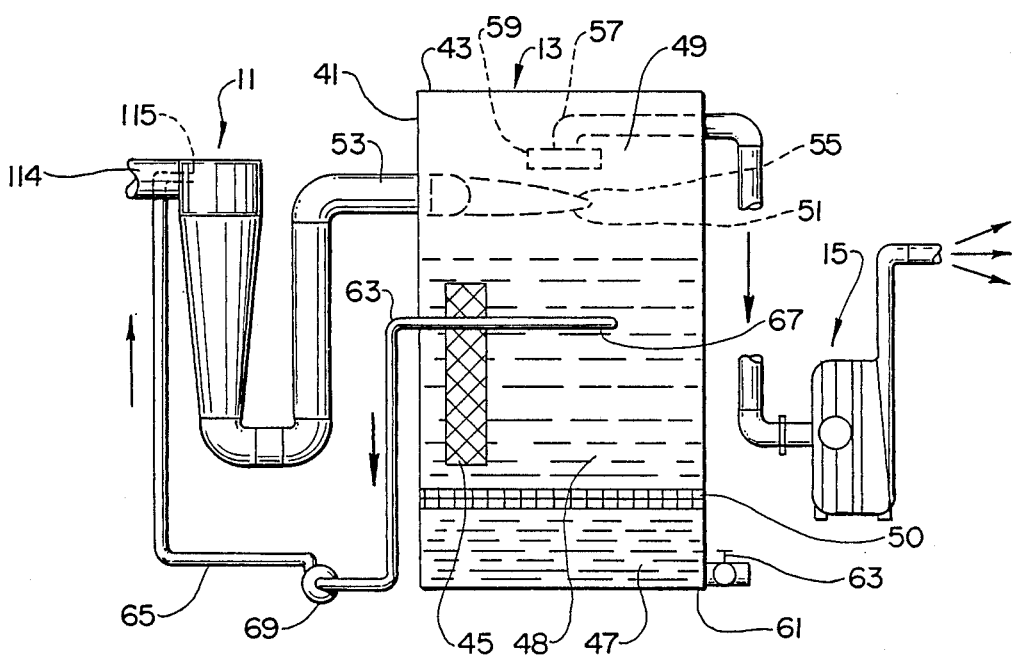

With reference to FIG. 6, primary cyclone vessel 11 may be disposed horizontally as shown, with liquid filter medium inlets 87 and contaminated gas inlet 85, and include vane assemblies (not shown) for producing tangential inlet streams like those described in connection with FIGS. 1-5 above. Filtered gas leaves primary cyclone vessel at outlet 122 and additional separation occurs in secondary cyclone separator 13 as described above.

Figure 7:
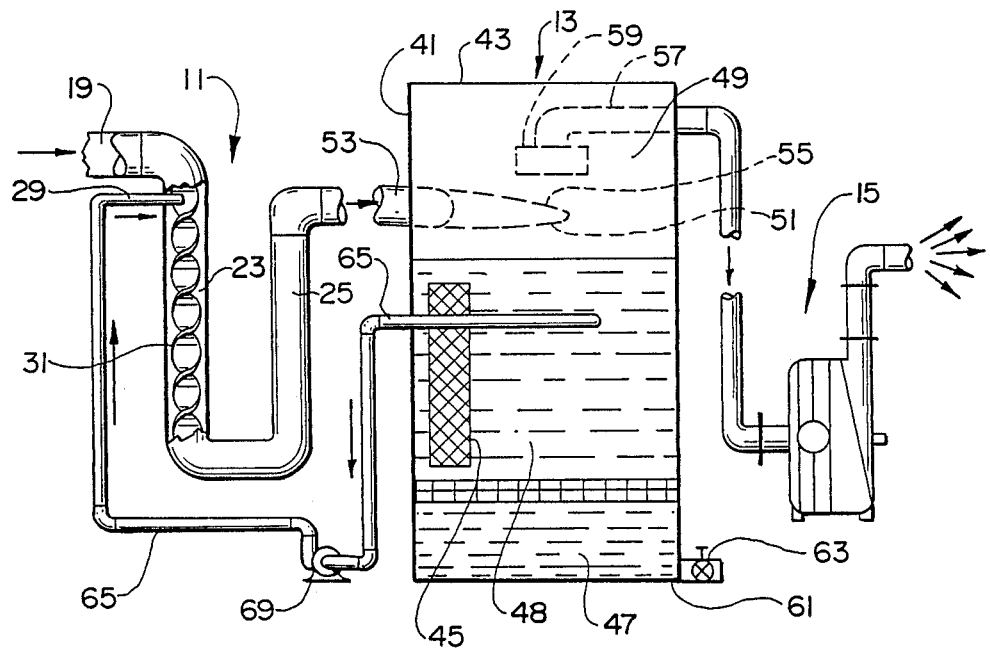
Figure 8:
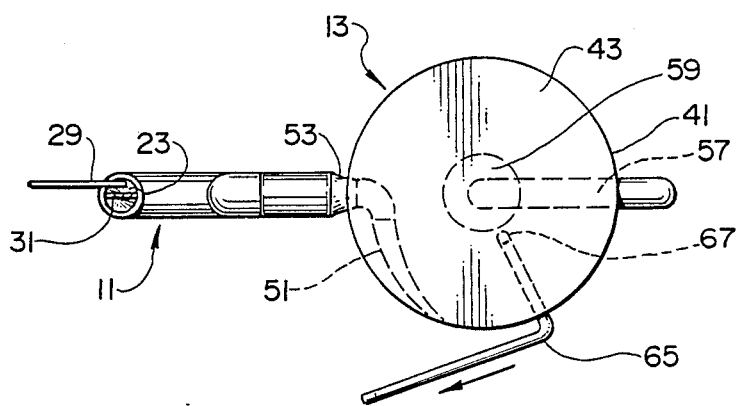

An alternative embodiment of primary cyclone vessel 11 is shown in FIGS. 7 and 8. In the embodiment of FIGS. 7 and 8 the primary cyclone vessel 11 includes spiral vanes 31 centrally located within the cavity, fixed top and bottom, so as to leave a space along the inner peripheral surface of the elongated descending section 23 to allow for a free vortex of liquid filter medium to form between the vanes and the wall thereof, and similar spiral vanes (not shown) arranged in the elongated ascending cavity or section 25. The spiral vanes are arranged to cause contaminated gas flowing through the sections to rotate to establish cyclonic movement to cause transfer of contaminant particles from gaseous suspension to liquid suspension as described above. The spiral vanes in the ascending section 25 are of opposite hand to the spiral vanes in descending section 23 to cause counter rotation of the gas stream to create turbulence, thus mechanical diffusion, which assists in the transfer of contaminant particles from the gas to the liquid filter medium.

Liquid filter medium is recirculated from secondary cyclone separator 13 through inlet 67 of line 65, under the force of pump 69, and into primary cyclone vessel 11 at inlet 29. Contaminated gas enters primary cyclone vessel 11 at inlet 19. In the alternative embodiment of FIGS. 7 and 8, tangential input and compound vortex formation is caused by vanes 31. In other respects the operation of the alternative embodiment of FIG. 7 and 8 is the same as the preferred embodiment of primary cyclone vessel 11 shown and described in connection with FIGS. 1-6 above.

The alternative embodiment of FIGS. 7 and 8, with spiral vanes 31 illustrates alternate structure capable of deflecting a liquid filter medium axial input stream as well as a similar contaminated gas input stream to achieve the requisite cyclonic flow paths in the primary cyclone vessel. Although the initial input into the primary cyclone vessel structure might not be tangential, the vanes deflect the input to advise tangential flow, all within the scope of the present invention.

From the foregoing description, it is evident that the present invention provides filter apparatus which does not rely on impingement of contaminants in an air stream with liquid spray droplets or an impingement surface, and so does not suffer from the deficiencies of known wet separators or bag and screen filters.

It will be appreciated that a filtering apparatus according to the present invention may be used in parallel clusters and/or in series, in series with other wet separators of the prior art or with conventional bag or screen filters. In addition, a filtering apparatus according to the invention may be adapted for use as a replacement filter in a vacuum cleaning system or other pneumatic conveying system originally fitted with a conventional impingement filter. In such systems where the impingement filter is in the form of a bag filter received within a cannister, the cannister may be modified so as to constitute the chamber of the cyclone separator forming part of the present invention. In this way, it is believed that the present invention may well be suitable as a replacement filter in existing systems.

We claim:

1. Apparatus for filtering a gas stream to remove solid, liquid or gaseous contaminants entrained therein, the apparatus comprising:
    a. a primary cyclone vessel having (1) a wall forming an elongated cavity with a substantially circular cross-section, (2) inlet means for independently feeding the gas stream and a stream of liquid filter medium in the same direction, tangentially into the cavity at one end thereof, with the stream of liquid in contact with the wall of the vessel, thereby impartinq to the gas stream and the liquid filter medium a cyclonic/rotary motion to form a compound vortex having an outer liquid strata in contact with the wall of the vessel and an inner gaseous strata moving in the same direction, whereby at least a substantial proportion of the contaminants are transferred from the gaseous strata to the liquid strata to form a liquid filter medium contaminants mixture and a filtered gas stream, and (3) single outlet means at the other end of the vessel for discharging the filtered gas stream/liquid filter medium contaminants mixture from the primary cyclone vessel, and
    b. a secondary cyclone vessel having means for separating the filtered gas stream from the liquid filter medium/contaminants mixture.

2. Apparatus according to claim 1 and means for separating the contaminants from the liquid filter medium/contaminants mixture.

3. Apparatus according to claim 2 wherein the means for separating the contaminants from the liquid filter medium/contaminants mixture includes means to regulate the speed of rotation of the liquid filter medium contaminants mixture.

4. Apparatus according to claim 3 wherein the means to regulate the speed of rotation of the liquid filter medium contaminants mixture comprises at least one baffle or other obstructive element in the liquid filter medium contaminants mixture.

5. Apparatus according to claim 4 wherein the liquid filter medium fed into the primary cyclone vessel is obtained from the liquid filter medium contaminants mixture in the means for separating the contaminants from the liquid filter medium.

6. Apparatus according to claim 5 wherein said liquid filter medium obtained from the liquid filter medium contaminants mixture is withdrawn from the central region of the liquid filter medium contaminants mixture at which region the liquid is least contaminated.

7. Apparatus for filtering a gas stream to remove solid, liquid or gaseous contaminants entrained therein, the apparatus comprising:
    a. a primary cyclone vessel having (1) a wall forming an elongated cavity with a substantially circular cross-section, (2) inlet means for independently feeding the gas stream and a stream of liquid filter medium in the same direction, tangentially into the cavity at one end thereof, with the stream of liquid in contact with the wall of the vessel, thereby impartinq to the gas stream and the liquid filter medium a cyclonic/rotary motion to form a compound vortex having an outer liquid strata and an inner gaseous strata moving in the same direction, whereby at least a substantial proportion of the contaminants are transferred from the gaseous strata to the liquid strata, and (3) single outlet means at the other end of the vessel for discharging the gas stream/liquid filter medium contaminants mixture from the primary cyclone vessel,
    b. a secondary cyclone vessel having means for injecting the mixture tangentially thereinto to impart a cyclonic/rotary motion thereto, whereby the mixture separates into filtered gas substantially free of contaminants and a liquid filter medium/contaminants mixture,
    c. means through which filtered gas is withdrawn from the secondary cyclone vessel, and
    d. means through which liquid filter medium laden with contaminants is withdrawn from the secondary cyclone vessel.

8. Apparatus according to claim 7 wherein said means through which filtered gas is withdrawn from the secondary cyclone vessel includes an outlet having a moisture trap.

9. A method of filtering a gas stream containing solid, liquid or gaseous contaminants entrained therein, omprising:
    a. independently feeding the gas stream, together with a stream of liquid filter medium in the same direction, tangentially into a vessel having an elongated cavity with a substantially circular cross-section, with the stream of liquid in contact with the vessel,
    b. conducting the gas stream and the liquid filter medium in a cyclonic/rotary motion in the primary vessel to form a compound vortex having an outer liquid strata in contact with the vessel and an inner gaseous strata moving in the same direction, whereby at least a substantial proportion of the contaminants are transferred from the inner gaseous strata to the outer liquid strata to form a filtered gas stream and a liquid filter medium/contaminants mixture, and c. discharging the filtered gas stream and liquid filter medium/contaminants mixture from a single outlet in the primary vessel.

10. The method cf claim 9 and the additional step of separating the filtered gas stream from the liquid filter medium/contaminants mixture.

11. The method of claim 10 wherein the step of separating the filtered gas stream from the liquid filter medium/contaminants mixture comprises the steps of:

a. conducting the filtered gas stream and liquid filter medium/contaminants mixture from the single outlet in the primary vessel in a cyclonic/rotary motion in a secondary vessel, whereby the mixture separates into filtered gas substantially free of contaminants and a liquid filter medium/contaminants mixture, and b. discharging the filtered gas substantially free of contaminants from the secondary vessel.

12. The method of claim 11 and the additional steps of a. collecting the liquid filter medium/contaminants mixture in the secondary vessel, and b. discharging liquid filter medium/contaminants from the lower portion of the collected liquid filter medium/contaminants mixture in the secondary vessel.

13. The method of claim 12 wherein the liquid filter medium having a direction corresponding to the direction of the gas stream is drawn from the central or upper region of the collected liquid filter medium/contaminants mixture in the secondary vessel.

* * * * *